United States Patent
Franksson

(10) Patent No.: US 10,907,711 B2
(45) Date of Patent: Feb. 2, 2021

(54) LINEAR ACTUATOR

(71) Applicant: Gretar Franksson, Hafnarfiroi (IS)

(72) Inventor: Gretar Franksson, Hafnarfiroi (IS)

( * ) Notice: Subject to any disclaimer, the term of this patent is extended or adjusted under 35 U.S.C. 154(b) by 39 days.

(21) Appl. No.: 16/242,319

(22) Filed: Jan. 8, 2019

(65) Prior Publication Data
US 2019/0211907 A1 Jul. 11, 2019

(30) Foreign Application Priority Data

Jan. 8, 2018 (GB) .................................. 1800260.0

(51) Int. Cl.
| | |
|---|---|
| F16H 25/20 | (2006.01) |
| F16H 25/22 | (2006.01) |
| F16H 37/06 | (2006.01) |
| F02K 1/76 | (2006.01) |
| F16H 37/08 | (2006.01) |

(52) U.S. Cl.
CPC ......... *F16H 25/2252* (2013.01); *F02K 1/763* (2013.01); *F16H 25/20* (2013.01); *F16H 37/065* (2013.01); *F16H 37/0826* (2013.01); *F16H 25/2015* (2013.01); *F16H 2025/2081* (2013.01); *F16H 2025/2087* (2013.01)

(58) Field of Classification Search
CPC .. F16H 25/20; F16H 25/2015; F16H 25/2252; F16H 2025/2062; F16H 2025/2087; F16H 2025/2081; H02K 7/06; F02K 1/763
See application file for complete search history.

(56) References Cited

U.S. PATENT DOCUMENTS

| | | | |
|---|---|---|---|
| 2,570,327 A | * | 10/1951 | Dodge .................... F16H 3/663 475/93 |
| 9,605,736 B1 | | 3/2017 | Foshage |
| 2007/0051847 A1 | | 3/2007 | Quitmeyer |
| 2011/0280699 A1 | * | 11/2011 | Zimmermann ....... B60P 1/4471 414/539 |

OTHER PUBLICATIONS

"Epicyclic gearing," Wikipedia page, url: <https://en.wikipedia.org/wiki/Epicyclic_gearing>, obtained May 8, 2020.*
"Gear train," Wikipedia page, url: <https://en.wikipedia.org/wiki/Gear_train>, obtained May 8, 2020.*

* cited by examiner

*Primary Examiner* — Richard W Ridley
*Assistant Examiner* — Brian J McGovern
(74) *Attorney, Agent, or Firm* — Bay State IP, LLC

(57) ABSTRACT

An electrically driven linear actuator 1 has a motor housing 2 having an end fitting 3 with a thrust eye 4. The housing comprises an end plate 5 carrying the end fitting, a tubular body 6, a mounting plate 7 and a closure member 8. The mounting plate has six recesses 12 for receiving the output ends 15 of six gearboxes 16. Each gearbox has a respective axially-attached electric motor 17, fixed in place via its gearbox. Output shafts 18 from the gearboxes extend through the mounting plate into a recess 19 in the closure member 8.

11 Claims, 4 Drawing Sheets

LINEAR ACTUATOR

CROSS REFERENCE TO RELATED APPLICATION

This application claims the benefit of and takes priority from United Kingdom Patent Application No. 1800260.0 filed on Jan. 8, 2018, the contents of which are herein incorporated by reference.

BACKGROUND OF THE INVENTION

Field of the Invention

The present invention relates to a linear actuator.

Description of the Related Art

It is known to provide a linear actuator, comprising:
a motor housing having
   one end fitting,
   a motor housed in the motor housing, and
   a reduction gearbox housed in the housing, the motor being connected to a input of the gearbox,
a telescopic arm, having
   an outer tube attached to the motor housing,
   an inner tube having another end fitting,
   an extension screw contained within the telescopic arm and having
      a driven end journalled at the motor housing end of the outer tube, in driving engagement with the motor and engaging
      a nut fast at the proximal end of the inner tube, rotation of the screw causing the inner tube to extend or retract with respect to the outer tube.

Such a linear actuator is shown in the applicant's WO 0125654.

SUMMARY OF THE INVENTION

The object of the present invention is to provide an improved linear actuator.

According to the invention there is provided a linear actuator, comprising:
a motor housing having
   one end fitting,
a telescopic arm, having
   an outer tube attached to the motor housing,
   an inner tube having another end fitting,
   an extension screw contained within the telescopic arm and having
      a driven end journalled at the motor housing end of the outer tube and engaging
      a nut fast at the proximal end of the inner tube, rotation of the screw causing the inner tube to extend or retract with respect to the outer tube,
characterised in that:
   a plurality of motors are arranged in the motor housing around a central axis;
   a respective plurality of planet wheels are arranged around the central axis and are drivingly connected to respective ones of the motors;
   a sun wheel is provided in driving engagement with the extension screw, the planet gearwheels being drivingly connected to the sun wheel,
the arrangement being such that the motors jointly, rotatingly drive the extension screw for extension or retraction of the inner tube with respect to the outer tube and the housing.

Normally a respective reduction gearbox will be connected between each motor its respective planet wheel. Conveniently these gearboxes will be single to double stage epicyclic gearboxes.

Whilst it is conceivable that the sun and planet wheels could be toothed wheels drivingly connected by belts, they will normally be gearwheels. This enables them to transmit the output torque of the motors, enhanced by the gearboxes as normally provided. There being a plurality of motors and gearboxes, the torque transmitted to the sun wheel is multiplied by the number of these. There can be as few as two, more likely three to six and possibly more, for instance twelve or even twenty four, increasing diameter of the housing.

Conveniently the sun wheel/planet wheel ratio is greater than 1:1, possibly between 1.5:1 and 4:1, and preferably between 1.75:1 and 3:1. This enhances further the torque applied to the screw for advancing or retracting the inner tube.

It is imaginable that there could be a gear-reduction between the sun wheel and the extension screw. It could a single or double stage epicyclic gearbox in place of such gearboxes between the motors and the planet wheels. It could also be in addition to such gearboxes.

In the preferred embodiment, where there is a gearbox between each motor and its planet wheel, a rolling element bearing is provided for journaling the screw and with it the sun wheel. Conveniently, an outer race of the bearing is captivated between the outer tube and a closure member of the housing; whilst an inner race is captivated between the screw and the sun wheel.

Whilst the motors could be carried by in a carrier opposite from the planet wheels, this is unnecessary where gearboxes are provided and made fast in a mounting plate. This arrangement maintains the sun and planet wheels in engagement.

In case of over-run of the motors, buffers are provided for limiting travel of the nut along the extension screw. Preferably the buffers are provided between the nut and the inner race and the nut and an end stop on the screw remote from the sun wheel.

Normally the motors will be electric motors.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE SEVERAL EMBODIMENTS

Figure 1:
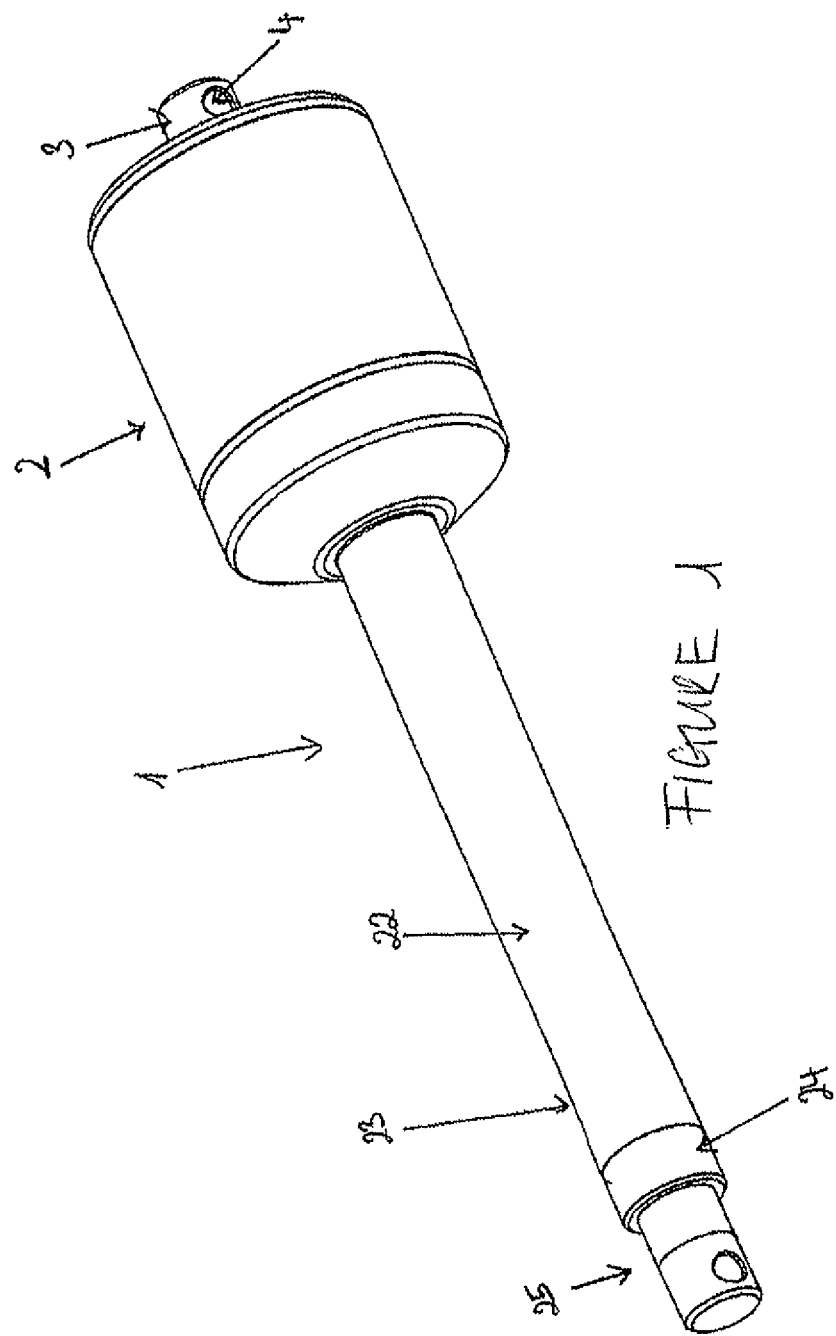
FIG. 1 is a perspective view of a linear actuator in accordance with the invention.
Figure 2:
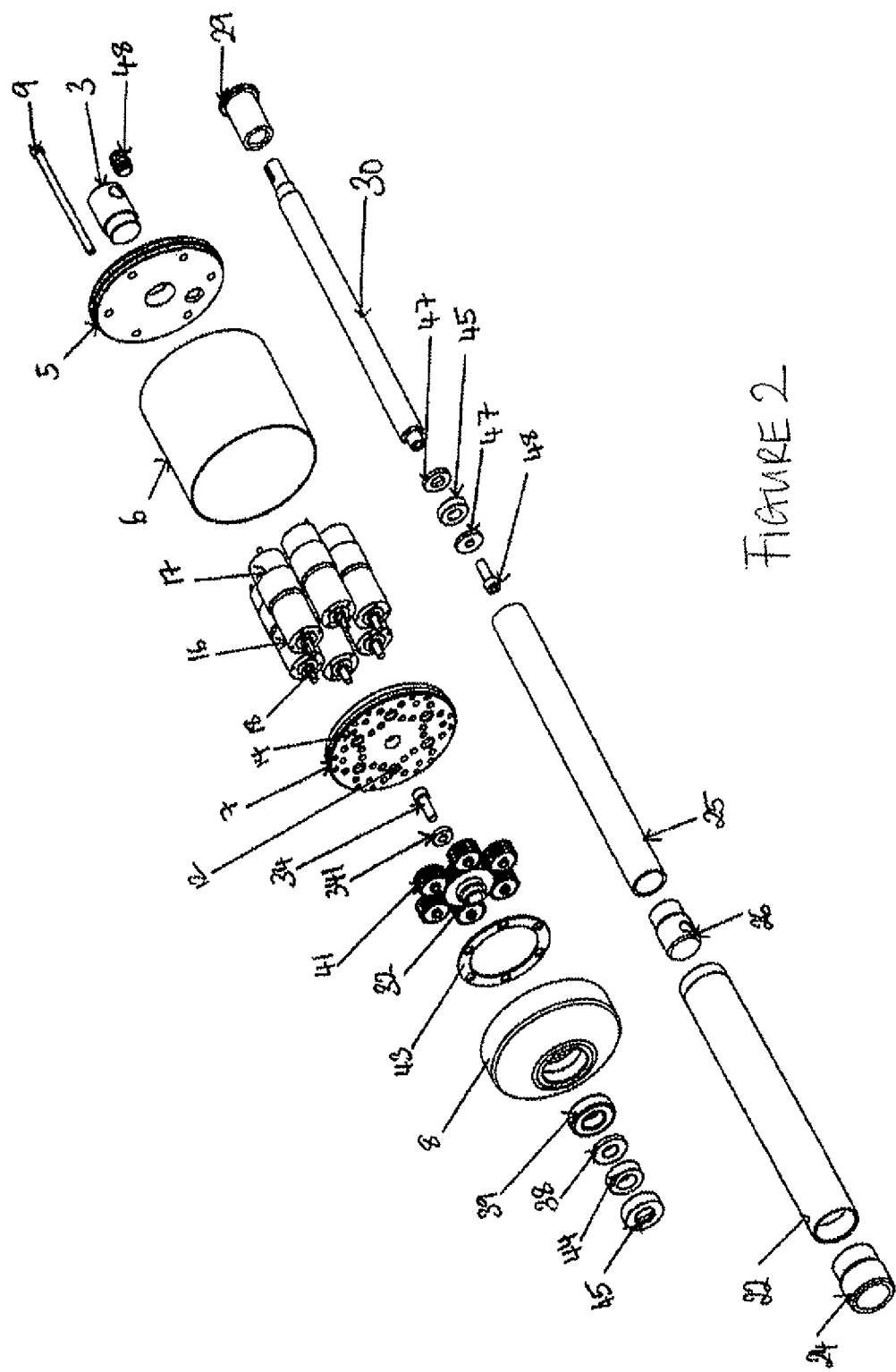
FIG. 2 is an exploded view of the linear actuator of FIG. 1.
Figure 3:
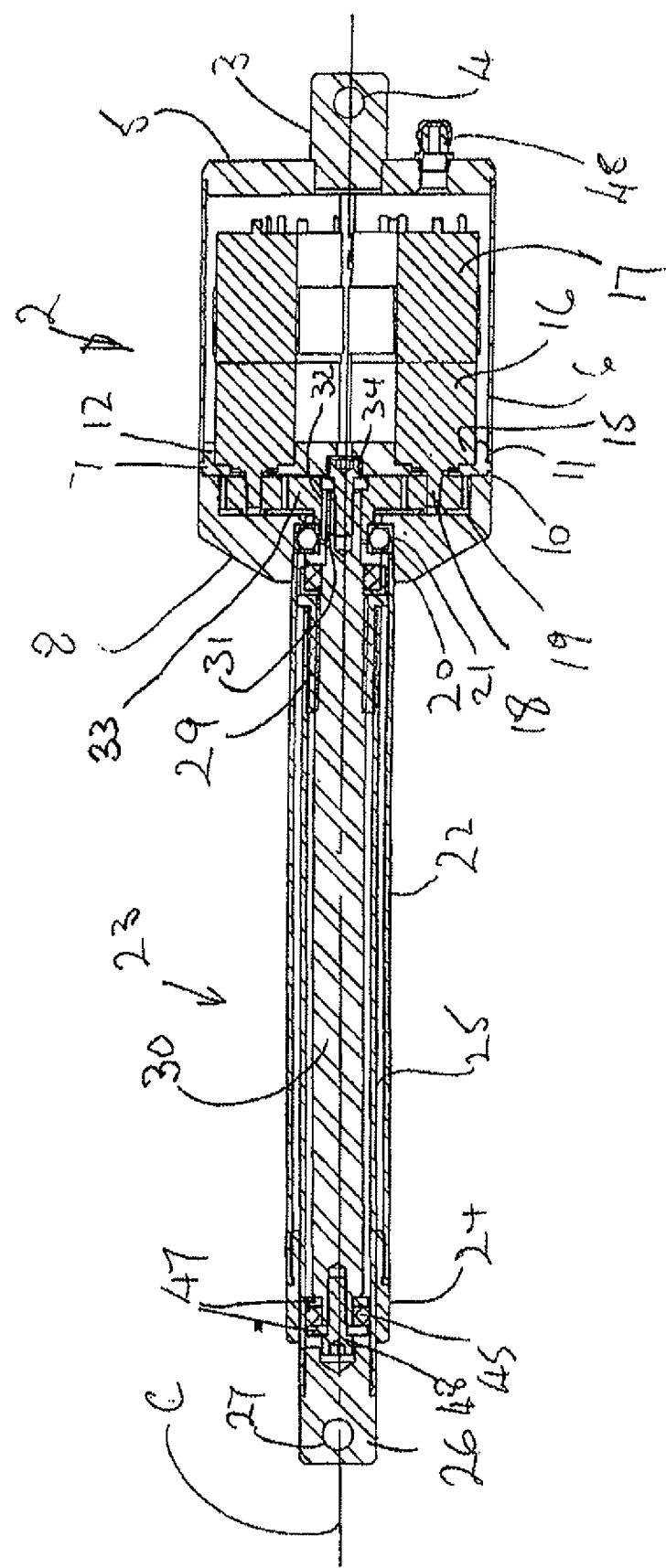
FIG. 3 is a central cross-sectional view of the linear actuator of FIG. 1.
Figure 4:
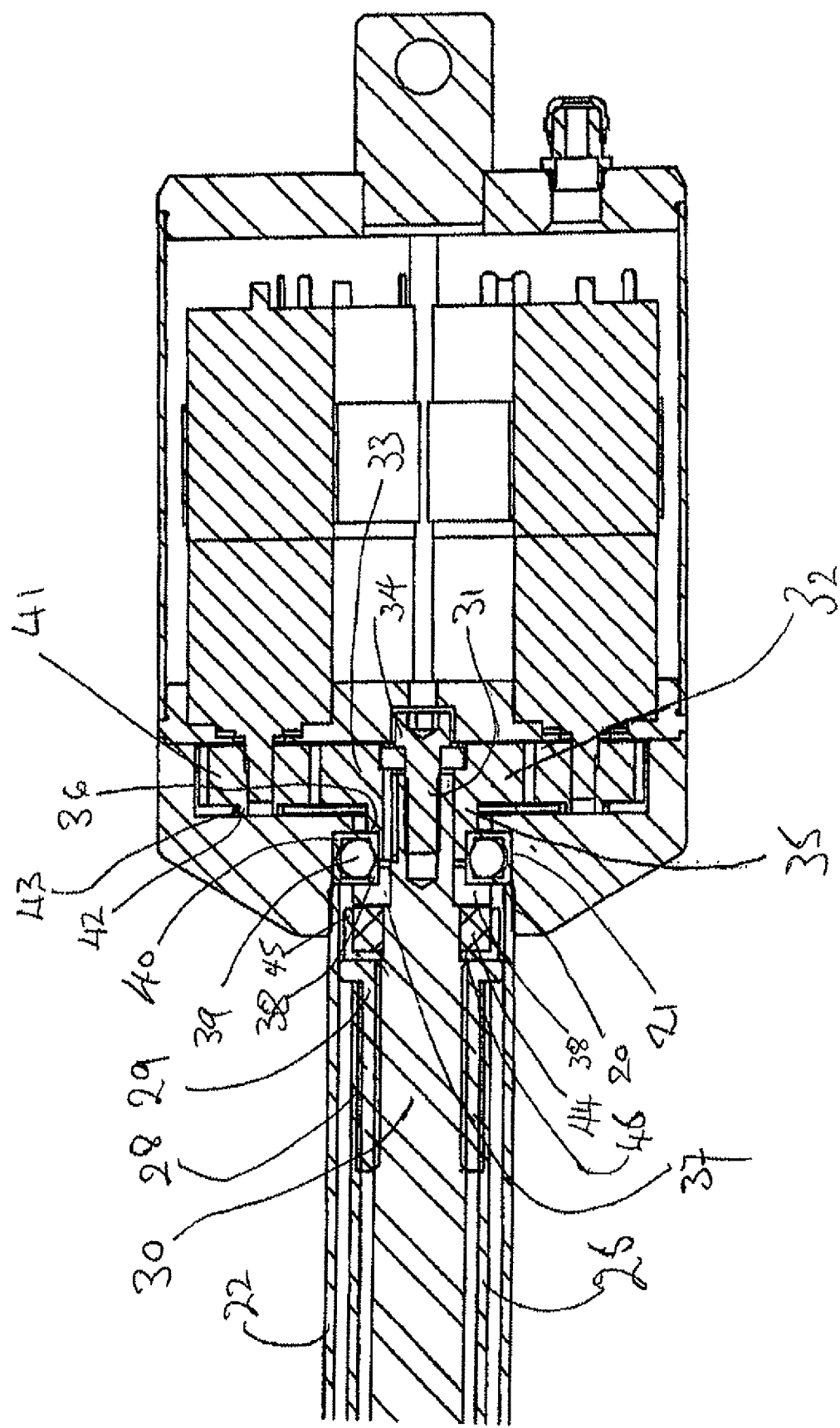
FIG. 4 is a more detailed view of the motor housing as shown in FIG. 3.

Referring to the drawings, an electrically driven linear actuator 1 has a motor housing 2 having an end fitting 3 with a thrust eye 4. The housing comprises an end plate 5 carrying the end fitting, a tubular body 6, a mounting plate 7 and a closure member 8. The housing is clamped together by six bolts 9 extending through the end plate to the mounting plate. The components of the housing have complementarily machined steps 10 and lips 11, for assuring their concentricity.

The mounting plate has six recesses 12 from the end plate side, with four respective bores 14 around each recess counter-bored from the other side, for receiving the output ends 15 of six gearboxes 16 and four respective fixture screws (not shown). Each gearbox has a respective axially-attached electric motor 17, fixed in place via its gearbox. Output shafts 18 from the gearboxes extend through the mounting plate into a recess 19 in the closure member 8. The arrangement places the motors 17, with their gearboxes, around a central axis C of the motor housing.

The closure member 8 has a central threaded and stepped bore 20, 21. Threaded in the bore is an outer tube 22 of an arm 23 of the actuator. At its remote end, the outer tube has a polymeric sealing bush 24 threaded into it. Within the bush extends an inner tube 25 having an end plug 26 with an eye 27. In use, pins in the eyes 4, 27 prevent the tubes from rotating with respect to each other.

The inner end 28 of the inner tube 25 has threaded into it an internally threaded collar 29, otherwise referred to as "a nut". A threaded shaft 30 extends centrally of the tubes throughout the extent of the outer tube 22. The shaft is otherwise referred to as "a screw". The threaded collar 29 is threadedly engaged with the threaded shaft. The innermost end 31 of the shaft is splined and receives a splined bore 32 of a sun gearwheel 33. This is held on the shaft by a bolt 34 and washer 341. The sun wheel has an extension 35 with a stepped shoulder 36. The shaft has a step 37 with a collar 38 abutting the step 37. An inner race 38 of a ball bearing 39 is captive between the shoulder 36 and collar 38. The outer race 40 of the bearing is captive between the end of the outer tube, threaded in the bore 20 and the step of the bore 21. Thus the threaded shaft 30 and the sun wheel are located axially.

The output shafts 18 of the gearboxes each carry planet gearwheels 41, which are thereby arranged around the central axis C. The planet wheels have bosses 42 engaged in a stabiliser ring 43 and they drivingly engage with the sun wheel. Driving of the motors in respective directions drives the threaded shaft/screw 30 and extends or retracts the inner tube by movement of the threaded collar/nut 29 along the thread of the screw 30.

The closure member 8 carries an outer tube 22, within which extends an inner tube 25 having an end plug 26 with an eye 27. The inner end 28 of the inner tube 25 has an internally threaded collar 29. A threaded shaft 30 extends centrally of the tubes throughout the extent of the outer tube 22. The threaded collar 29 is engaged with the threaded shaft. The innermost end 31 of the shaft receives a splined sun gearwheel 33. These are journalled to the motor housing and the outer tube by a ball bearing 39.

The output shafts 18 of the gearboxes each carry planet gearwheels 41, which are thereby arranged around the central axis C. The planet wheels have bosses 42 engaged in a stabiliser ring 43 and they drivingly engage with the sun wheel. Driving of the motors in respective directions drives the threaded shaft 30 and extends or retracts the inner tube by movement of the threaded collar 29 along the thread of the screw 30.

Buffers 44, 45 are provided at opposite ends of the shaft 30, to allow the stalling current to be detected and the motors stopped in positions corresponding to opposite end of travel of the nut and the inner tube. The inner buffer 44 is an elastomeric ring between the collar 38 and a further collar 46. The outer buffer is a similar elastomeric ring between two thick washers 47, the outer of which is held fast on the end of the shaft by a bolt 48. When the arm is fully extended, the threaded collar/nut 29 abuts the inner of the washers 47 to compress the outer buffer. When the inner tube is fully withdrawn, the threaded collar/nut 29 abuts the further collar 46 to compress the inner buffer.

All the parts within reason of the actuator and particularly exposed parts are of stainless steel, with the notable exception of the sealing bush 24. With the joints between the parts sealed, the actuator is waterproof, including at an electric lead gland 48 in the end plate 5.

What is claimed is:

1. A linear actuator, comprising:
   a motor housing having
      one end fitting,
      a closure member and
      a tubular body extending between the one end fitting and the closure member, the one end fitting, the closure member and the tubular body being clamped together and
   a telescopic arm, having
      an outer tube attached to the motor housing at the closure member,
      an inner tube having another end fitting,
      an extension screw contained within the telescopic arm and having
         a driven end journalled via a rolling element bearing at the motor housing end of the outer tube and in the closure member, the driven end engaging
         a nut fast at the proximal end of the inner tube, rotation of the extension screw causing the inner tube to extend or retract with respect to the outer tube,
   characterised in that:
      a mounting plate is included in the motor housing fast with the closure member;
      a plurality of gearboxes are mounted on the mounting plate within the tubular body around a central axis;
      a plurality of motors are arranged in the motor housing around the central axis, each motor being:
         within the tubular housing and
         fixed to and drivingly connected to a respective one of the gearboxes;
      a plurality of planet gear wheels are arranged around the central axis and are drivingly connected to a respective one of the gearboxes via a respective output shaft which extends through the mounting plate;
      a sun gear wheel is provided fast with the extension screw, the planet gear wheels being drivingly connected to the sun gear wheel;
      a stabilizer ring is provided at the sun gear wheel and the planet gear wheels have bosses engaged in apertures in the stabilizer ring to hold the planet gear wheels in mesh with the sun gear wheel,
   the arrangement being such that the motors jointly, rotatingly drive the extension screw for extension or retraction of the inner tube with respect to the outer tube and the motor housing.

2. A linear actuator as claimed in claim 1, wherein the gearboxes are single to double stage epicyclic gearboxes.

3. A linear actuator as claimed in claim 1, wherein the sun gear wheel/planet gear wheel ratio is greater than 1:1.

4. A linear actuator as claimed in claim 1, wherein the sun gear wheel/planet gear wheel ratio is between 1.5:1 and 4:1.

5. A linear actuator as claimed in claim 4, wherein the sun gear wheel/planet gear wheel ratio is between 1.75:1 and 3:1.

6. A linear actuator as claimed in claim 1, wherein:
an outer race of the rolling element bearing is captivated between the outer tube and the closure member and
an inner race is captivated between the extension screw and the sun gear wheel.

7. A linear actuator as claimed in claim 1, wherein there is a gear-reduction between the sun gear wheel and the extension screw.

8. A linear actuator as claimed in claim 1, including buffers are provided for limiting travel of the nut along the extension screw.

9. A linear actuator as claimed in claim 1, wherein the motors are electric motors.

10. A linear actuator as claimed in claim 1, wherein the motor housing is secured by clamp bolts arranged in the motor housing around the central axis between motors.

11. A linear actuator as claimed in claim 1, including eyes in the end fittings to restrain rotation of the inner tube and nut on driving of the sun gear wheel and the extension screw by the motors.

\* \* \* \* \*